Patented Aug. 12, 1941

2,252,466

UNITED STATES PATENT OFFICE 2,252,466

GLASS OF HIGH SOFTENING POINT

Walter Hänlein, Berlin-Haselhorst, Germany, assignor to General Electric Company, a corporation of New York No Drawing. Application September 10, 1938, Serial No. 229,330. In Germany February 2, 1938

3 Claims. (Cl. 106—52)

This invention relates to glasses of high softening point.

In many cases it is desirable to use a glass in place of quartz for electric discharge bulbs, such as luminous tubes, high-pressure mercury-vapor lamps, amplifier tubes or transmitter tubes, rectifiers or the like. Such glasses should have a high softening point and should not devitrify when the device is in operation. Ordinary glasses will not meet this requirement.

It has been suggested heretofore that high softening-point glasses be made by suitably combining with quartz glass (obtained by melting pure natural quartz or silica free from water), during the melting operation, from one to five per cent of one or more acidic oxides of the fourth group of the periodic system, for example, titanium oxide, zirconium oxide, etc. However, such glasses do not entirely meet the service requirements of glasses to be used in electric discharge bulbs.

I have discovered that glasses having a softening point between approximately 1000° and 1200° C. and having a coefficient of linear thermal expansion at 50° C. between approximately $7 \times 10^{-7}$ and $14 \times 10^{-7}$ can be made from raw mixes comprising at least 80 per cent silica and the remainder alumina, an oxidic component selected from the class consisting of one or more alkaline-earth oxides and mixtures of beryllium oxide and one or more alkaline-earth oxides, and another oxidic component selected from the class consisting of zirconium oxide, thorium oxide, and mixtures of zirconium oxide and thorium oxide.

In making the glasses of this invention the total content of alumina and zirconia, or alumina and thoria, or alumina, zirconia and thoria should not exceed substantially three times the amount of the above-named alkaline earth or beryllium oxide-alkaline earth oxidic component. Further, when the content of zirconia and/or thoria is relatively small, for example of the order of 1 per cent, the oxidic component consisting of one or more alkaline-earth oxides or of a mixture of beryllia and one or more alkaline-earth oxides (which mixture is a preferred oxidic component) should be at least one-half the amount of alumina.

In certain cases it is desirable to incorporate boric oxide in the glasses in order to improve their finishing properties under the heat of a flame. In such case the amount of boric oxide should not exceed substantially 12 per cent by weight of the whole. Further, the amount of boric oxide should be at least one-half, and should not exceed substantially twice, the total amount of alumina plus zirconia and/or thoria.

The following table shows by way of illustration the composition of glasses prepared in accordance with the present invention, the temperature at which the stated components were melted together to form the glass, and characteristic properties of the resulting product:

Table I

|  | No. 1 | No. 2 | No. 3 | No. 4 |
|---|---|---|---|---|
|  | Percent by weight | Percent by weight | Percent by weight | Percent by weight |
| Silicon oxide $(SiO_2)$ | 90.0 | 94.0 | 91.5 | 85.0 |
| Aluminum oxide $(Al_2O_3)$ | 4.5 | 3.0 | 5.0 | 4.5 |
| Thorium oxide $(ThO_2)$ | 1.0 | 0.5 | 0.5 | 1.0 |
| Zirconium oxide $(ZrO_2)$ | 2.0 | 1.0 | 0.5 | 2.0 |
| Calcium oxide $(CaO)$ | 1.0 | 0.5 | 1.0 | 1.0 |
| Barium oxide $(BaO)$ | 1.0 | 0.5 | 1.0 | 1.0 |
| Beryllium oxide $(BeO)$ | 0.5 | *0.5 | 0.5 | 0.5 |
| Boric oxide $(B_2O_3)$ | -- | -- | -- | 5.0 |
| Temperature at which the components were melted together to form the glass, °C | 2100 | 2100 | 2080 | 2050 |
| Softening point of the glass, °C | 1100 | 1120 | 1085 | 1010 |
| Coefficient of linear thermal expansion at 50° C | $9.8 \times 10^{-7}$ | $7.7 \times 10^{-7}$ | $7.9 \times 10^{-7}$ | $13.7 \times 10^{-7}$ |

*Note.—If desired, in certain cases the beryllia may be omitted and the alkaline-earth oxide correspondingly increased.

Glasses made as above described are mechanically strong and are especially suitable for use, in place of quartz, in the manufacture of electric discharge tubes or bulbs.

What I claim as new and desire to secure by Letters Patent of the United States is:

1. A glass formed of

| | Per cent by weight |
|---|---|
| Silicon oxide $(SiO_2)$ | 94.0 |
| Aluminum oxide $(Al_2O_3)$ | 3.0 |
| Thorium oxide $(ThO_2)$ | 0.5 |
| Zirconium oxide $(ZrO_2)$ | 1.0 |
| Calcium oxide $(CaO)$ | 0.5 |
| Barium oxide $(BaO)$ | 0.5 |
| Beryllium oxide $(BeO)$ | 0.5 | said glass having a softening point of the order of 1120° C. and a coefficient of linear thermal expansion at 50° C. of the order of $7.7 \times 10^{-7}$.

2. A glass having a softening point at least as high as 1000° C., said glass consisting, by weight, of 90 to 94 per cent silica, 3 to 5 per cent alumina, 1.5 to 2.5 per cent of an oxidic component selected from the class consisting of one or more alkaline-earth oxides and mixtures of beryllium oxide and one or more alkaline-earth oxides, and 1 to 3 per cent of another oxidic component selected from the class consisting of zirconium oxide, thorium oxide and mixtures of zirconium oxide and thorium oxide, the total amount of alumina plus the said second named oxidic component not exceeding substantially three times the amount of the said first named oxidic component.

3. A glass having a softening point at least as high as 1000° C., said glass consisting, by weight, of 90 to 94 per cent silica, 3 to 5 per cent alumina, about .5 per cent beryllia, 1 to 2 per cent of at least one alkaline-earth oxide, and 1 to 3 per cent of an oxidic component selected from the class consisting of zirconium oxide, thorium oxide, and mixtures of zirconium oxide and thorium oxide, the total amount of alumina plus the said oxidic component not exceeding substantially three times the total amount of beryllia plus alkaline-earth oxide, and the total amount of beryllia plus alkaline-earth oxide being at least one-half the amount of alumina.

WALTER HÄNLEIN.